United States Patent [19]

Baackmann et al.

[11] Patent Number: 4,476,561
[45] Date of Patent: Oct. 9, 1984

[54] DEVICE FOR REMOTELY SUPERVISING OPERATION OF A BRANCHED DATA-TRANSMISSION NETWORK

[75] Inventors: Dirk Baackmann, Lauf; Georg Hecht, Nuremberg; Johann Schlagenhaft, Nuremberg; Karl Schnell, Nuremberg, all of Fed. Rep. of Germany

[73] Assignee: Te Ka De Felten & Guilleaume Fernmeldeanlagen GmbH, Nuremberg, Fed. Rep. of Germany

[21] Appl. No.: 363,140

[22] Filed: Mar. 29, 1982

Related U.S. Application Data

[63] Continuation of Ser. No. 134,924, Mar. 28, 1980, abandoned.

[30] Foreign Application Priority Data

Apr. 4, 1979 [DE] Fed. Rep. of Germany ....... 2913402

[51] Int. Cl.$^3$ .............................................. G06F 11/30
[52] U.S. Cl. ........................................ 371/25; 364/900
[58] Field of Search .................... 371/25, 68; 364/200, 364/900

[56] References Cited

U.S. PATENT DOCUMENTS

| 3,813,647 | 5/1974 | Loo | 364/900 |
| 3,967,103 | 6/1976 | Cachuela et al. | 371/25 |
| 4,001,785 | 1/1977 | Miyazaki et al. | 364/900 |
| 4,084,262 | 4/1978 | Lloyd et al. | 364/900 |

OTHER PUBLICATIONS

Baackmann, "Das Breitband-Kommunikations-System KTV 400", *Te Ka De Tech. Mitt.*, 1981, pp. 35-39.
Higby, Jr., "Error Detection and Location", *IBM Tech. Disclosure Bulletin*, vol. 1, No. 4, Dec. 1958, p. 17.

*Primary Examiner*—David H. Malzahn
*Attorney, Agent, or Firm*—Michael J. Striker

[57] ABSTRACT

A rotary switch selects individual incoming transmissions which characterize the actual operation of amplifiers and like components within a data-transmission network.

A memory is programmed with data characteristic of incoming transmissions which indicate proper operation of the components actually supervised. As the rotary switch selects an individual transmission, the transmission is interpreted and compared with the data stored in the memory. In the event that a defective component is detected, an alarm sounds and repairs can be quickly made since the individually defective component can be identified automatically.

3 Claims, 1 Drawing Figure

DEVICE FOR REMOTELY SUPERVISING OPERATION OF A BRANCHED DATA-TRANSMISSION NETWORK

This is a continuation, of application Ser. No. 134,924, filed Mar. 28, 1980 now abandoned.

BACKGROUND OF THE INVENTION

1. FIELD OF THE INVENTION

This invention pertains to a system which can be used to supervise the operation of, for example, a cable television transmission network. Such a network conventionally contains a plurality of spurred subnetworks, in which there exists a plurality of components such as amplifiers which must be supervised in order to detect malfunctions and thereby quickly locate the situs of a malfunction in the event that a malfunction actually occurs.

Thus, more specifically, this invention pertains to a device which will not only monitor the overall functioning of a branched data-transmission network, but will also supervise the proper functioning of individual components therein.

2. DESCRIPTION OF THE PRIOR ART

Various systems have been proposed which will supervise the operation of amplifiers within a cable television network. In one such device, disclosed in German Auslegungsschrift No. 26 55 404, each of the amplifiers which is to be monitored is equipped with a transmitter which operates at a frequency unique to the amplifier involved. These transmitters then send characteristic transmissions to a central distribution point, where the failure of an amplifier to produce an acceptable signal level can be detected and the situs of the failure identified to enable repairs to be made quickly. When a device of this type is to be used with large cable television networks, the cost is excessively high because of the large number of different frequencies which are required in order to specifically identify each individual component which is to be monitored. In the event that limitations are placed on the maximum number of characteristic frequencies utilized in order to reduce manufacturing costs, it only becomes possible to generally locate the situs of an amplifier failure within a given subnetwork, which results in increased repair costs because of the additional labor necessary to pin down the exact location of a failed component.

Finally, such a device has the disadvantage that conventional practice dictates that a failure of a component within the system trigger an alarm at the central cable television distribution station in order to alert operating personnel that a failure has indeed occurred. However, after a failure has occurred and appropriate repair crews have been dispatched, the alarm will repeated by sound until such time as the component in question has been fixed. Such a continuous alarm is superfluous and undesirable.

Thus, it would be advantageous to provide a device for remotely supervising the operation of a branched data-transmission network, such as a cable television network, which could be more inexpensively manufactured in a fashion that would allow a failure to be automatically localized while preventing repeated sounding of an alarm after a failure in the system has been detected.

SUMMARY OF THE INVENTION

These objects, along with others which will become apparent hereinafter, are achieved by the use of a device which, as in prior systems, utilizes transmissions of characteristic frequencies associated with amplifiers and like components to detect component malfunction. However, in this invention the number of characteristic frequencies utilized is held to the maximum number of components which are to be monitored within any sub-network within the system. Thus, within a given subnetwork, all the components which are monitored are associated with transmissions of unique and characteristic frequencies.

These transmissions are routed to the central distribution point of the data-transmission network, and are all connected to a single rotary switch. This switch can connect any individual transmitter to an interpreter which can interpret the transmission which is routed to the interpreter via the switch. This interpreter can be adjusted to any one of the number of frequencies which are utilized. For example, if any individual subsystem of the data-transmission network will have at most ten components to be monitored, the interpreter can be adjusted to interpret any one of ten transmission frequencies.

Both the interpreter and the switch are controlled by a control system which adjusts the interpreter to interpret a transmission frequency which corresponds to the transmission which is routed to the interpreter via the rotary switch. Moeover, this control system also cooperates with an addressable memory. This memory is programmed with data representing acceptable signal levels corresponding to each one of the transmissions that is to be monitored by the device. Thus, when the rotary switch is advanced by the control system to route a given transmission to the interpreter, the interpreter is automatically adjusted to the frequency at which such a transmission will be transmitted, and the memory will be addressed so as to read out the proper signal level which that transmission should have.

An output signal generated by the interpreter is then compared with the desired transmission level in a comparator which is connected to an alarm. In the event that the comparison indicates that the transmission in question is associated with an adequate signal level from the component being monitored, the alarm remains untriggered and the control system advances the rotary switch, re-addresses the memory, and readjusts the interpreter so as to enable the next transmission to be monitored.

This process is then repeatedly executed in a sequence. One by one, each transmission is individually monitored and evaluated so as to ascertain whether or not the component with which the transmission is associated is functioning properly. In the event that the component is functioning properly, the alarm remains untriggered, while in the event that the component is functioning improperly, the alarm will be sounded by the comparator.

After a component failure has been detected, the rotary switch can be examined in order to ascertain which component is defective. In this fashion, the situs of a component failure can be immediately identified, so that appropriate repairs can take place.

The invention also includes a means which enables the memory to be programmed by the transmissions which are being monitored. The first time that the device is operated, all the various transmissions (which initially will be operating properly) will be evaluated by the interpreter and the output signals generated thereby will be stored in the memory at unique addresses dictated by the control system. During this phase of operation, the comparator is cut off so that no alarms can sound. After the memory has been programmed, the means can then be reset so as to enable comparisons to occur and to thus insure that proper supervision of the components in question takes place. In the event that a failure is detected and indentified by examination of the position to which the rotary switch is set, the means can be operated to reprogram the memory at that address which corresponds to the defective component. Such reprogramming essentially programs the memory with a signal that represents a defective component in the address in question. Thus, during subsequent comparisons, the alarm will not sound superfluously, and will only sound after the component in question has been repaired or replaced. At that time, the memory can once again be reprogrammed in order to enable subsequent supervision to occur.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 illustrates a transmission network incorporating the monitoring device of the invention; and FIG. 3 is a block diagram of a memory in the device of FIG. 1.

DESCRIPTION OF THE PREFERRED EMBODIMENTS

Figure 1:
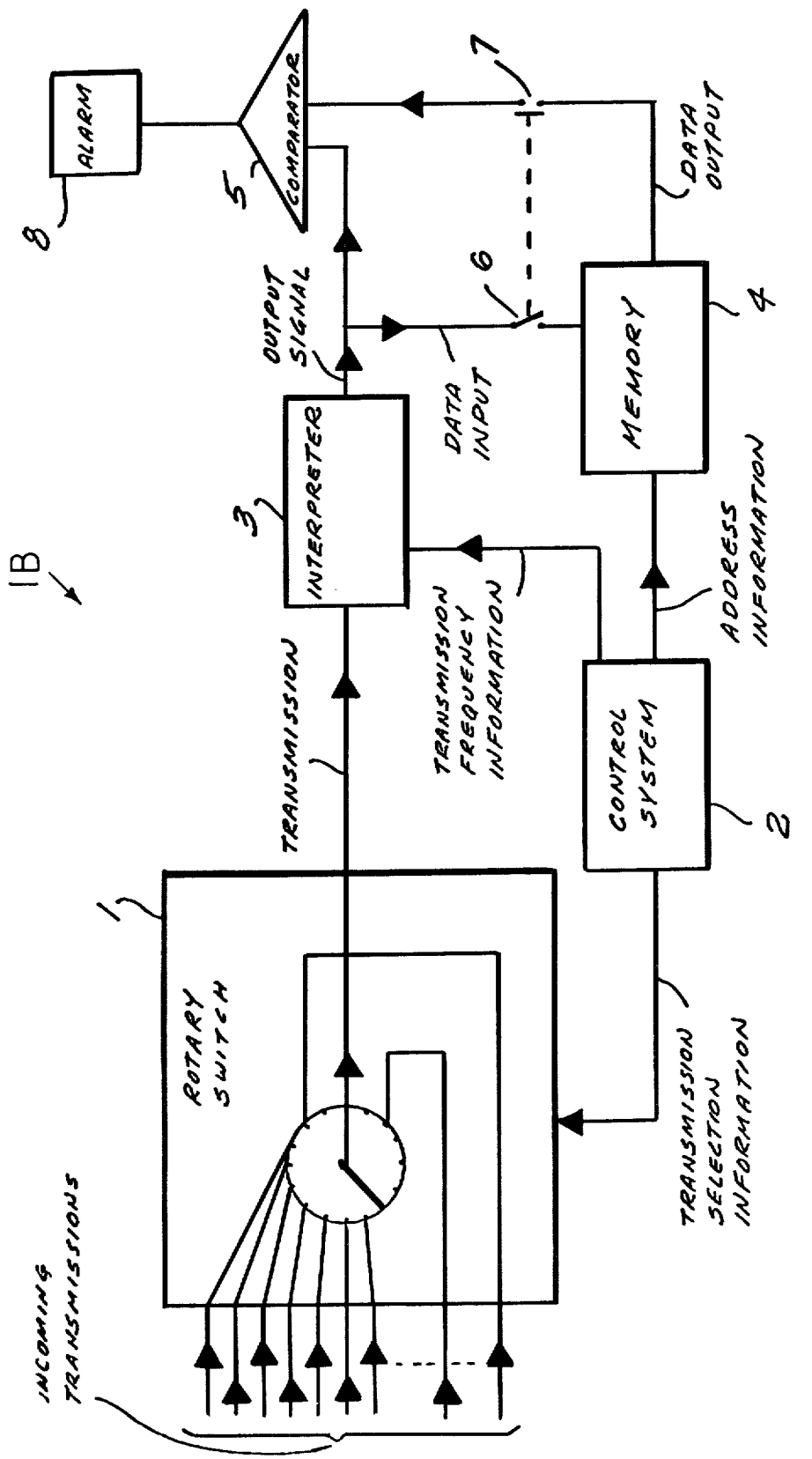
FIG. 1 shows a block diagram of the invention.

A main data-transmission network 11, 12, 13, 14 shown in FIG. 2 contains a plurality of components such as amplifiers F1, 1; F1, 2; F3, 1 and F4, 1 which are associated with various subnetworks 11; 12; 13' and 14' within the data-transmission network. Each of these components $F_{1,1}$-$F_{4,1}$ is associated with a transmitter (not shown) which generates a transmission of a characteristic frequency. The number of such characteristic frequencies is relatively small, and is equal to the maximum number of components to be supervised within a single subnetwork.

Referring to FIG. 1, all such transmissions are routed to a scanner, such as a rotary switch 1 of a supervising station 1A. Although the rotary switch 1 as shown in the Figure is drawn to indicate a mechanical rotary switch which is connected to a plurality of incoming lines from the various transmitters which are associated with the components to be monitored, it will be understood by those skilled in the art that the rotary switch 1 need not necessarily be mechanical, but may be purely electronic in operation. Moreover, it will be understood by those skilled in the art that it is perfectly possible for the incoming transmissions to be multiplexed on a single line or to be otherwise transmitted, and that the only function of the rotary switch 1 is to select an individual one of the incoming transmissions and to continue such selection in a predetermined sequence such that all of the incoming transmissions are eventually monitored. In the embodiment taught herein, the rotary switch 1 operates in a delayed fashion, so as to prevent spurious error signals from being generated by switching transients and contact chatter.

The rotary switch 1 connects an individual incoming transmission to an interpreter 3. This interpreter can be adjusted to respond to any one of the frequencies which the incoming transmissions may have. Such adjustment takes place by operation of control system 2, which is connected both to the interpreter 3 and also to the rotary switch 1. The control system 2 operates in such a fashion as to cause the rotary switch 1 to select an incoming transmission, and simultaneously causes the interpreter 3 to be adjusted to that frequency at which the transmission selected actually takes place. The interpreter 3, after having been properly adjusted by control system 2, generates an output signal which is characteristic of the incoming transmission which has been selected by the rotary switch 1.

A memory 4 is connected to a control system 2. The memory 4 can either be programmed by incoming data which can be stored therein, or the memory can read out data stored therein, depending upon the positions of switches 6 and 7. The control system 2 generates address information for each individual incoming transmission which is to be supervised. Referring to FIG. 3, each incoming transmission $f_{1,1}$ to $f_{4,04}$ is associated with an unique address 1 to 256 in memory 4. In the event that single-pole single-throw switch 6 is closed (which closure will cause single-pole single-throw switch 7 to be opened), the output signal from interpreter 3 will be stored in memory 4 according to the address information generated by control system 2. Thus, assuming that memory 4 is initially unprogrammed, the first time that the device is utilized, switch 6 will be closed, switch 7 will be opened, and the device will then be turned on. After turn on, control system 2 will cause rotary switch 1 to select during parts of the total selection or scanning cycle individual incoming transmissions and will appropriately adjust interpreter 3 to the frequency of each incoming transmission so selected. Simultaneously, control system 2 will generate appropriate address information for each transmission so selected. Thus, when a transmission is selected, the output signal generated thereby will be programmed into a unique address in memory 4, where the information can be stored and accessed later on for subsequent use.

This process continues as rotary switch 1 is advanced by control system 2, and each individual incoming transmission is supervised and its corresponding output signal stored in memory 4. After this initial scanning cycle is complete, memory 4 will be programmed with the output signals generated by interpreter 3 and the supervisory function of the device can thus begin.

After memory 4 has been completely programmed, switch 6 is opened and switch 7 is closed. Then, as control system 2 advances rotary switch 1, output signals generated by interpreter 3 are compared in comparator 5 with data stored in memory 4. In the event that comparator 5 determines that the output signal generated by interpreter 3 is substantially equivalent to the data stored in memory 4, alarm 8 will remain silent since such substantial equivalence indicates that the incoming transmission in question is characteristic of a properly functioning data-transmission component, such as an amplifier.

In the event that comparator 5 detects an inequivalence between output signals generated by interpreter 3 and data output from memory 4, comparator 5 will cause alarm 8 to sound, informing appropriate operating personnel that at least one component in the data-transmission system is not operating properly. By examination of rotary switch 1, such personnel can immediately ascertain which transmission was under supervision at the time alarm 8 was triggered, enabling the location of the defective component to be ascertained immediately. Appropriate repair measures can then be taken.

In order to prevent alarm 8 from repeatedly sounding each time that the incoming transmission corresponding to the defective component is supervised, switch 6 may be momentarily closed by an operator and switch 7 thus momentarily opened by virtue of the mechanical connection between the two switches. This will cause the "wrong" output signal to be programmed into memory 4, so that subsequent supervisions of the transmission associated with a defective component will not retrigger alarm 8. After the component in question has been repaired or replaced, alarm 8 will be triggered once again after the corresponding transmission has been selected by rotary switch 1, indicating that the repair has taken place and enabling the proper reprogramming of memory 4 via operation of switches 6 and 7.

It will be noted that control system 2 can be programmed so as to cause rotary switch 1 to skip individual incoming transmissions in the event that it is not necessary to repeatedly supervise each individual component in the data-transmission network. For example, control system 2 can be programmed so as to cause each subnetwork within the data-transmission network to be tested as a whole, by selecting those transmissions which correspond to components which are closest to the central distribution center 1A (FIG. 2) of the data-transmission network. Then, the control system can be programmed so as to select transmissions corresponding to more remote components only in the event that a defective component is detected somewhere within an individual subnetwork.

Because the number of frequencies at which an incoming transmission can be transmitted is limited to the maximum number of components to be monitored within any single subnetwork, the bandwidth required for the incoming transmissions is relatively small. Thus, the expenditure for a wide bandwidth system and a wide bandwidth interpreter is unnecessary.

The number of different frequencies in such a branched data-transmission network is then relatively small, when it contains a plurality of spurred subnetworks. In a single subnetwork every amplifier is equipped with a transmitter which operates at a frequency unique to this amplifier involved. The control system 2 causes the interpreter 3 to be adjusted to the frequency of each incoming transmission. In a network with for example four subnetworks each with ten amplifiers to be monitored, the interpreter 3 must be adjusted to interpret only the maximum number of ten characteristic frequencies. The control system 2 then adjusts the interpreter 3 in a cycle with ten frequencies and when the transmitter send a characteristic transmission, each incoming transmission is associated with an unique adress in memory 4 which contains fourty adresses. If there are for example only eight characteristic frequencies in a subnetwork utilized, the control system 2 stored in the memory 4 for the ninth and tenth not used frequency the equivalent data. If the subnetwork is completed with ten amplifiers the memory 4 would be programmed by an operator as above described.

It will be understood that each of the elements described above, or two or more together, may also find a useful application in other types of devices differing from the types described above.

While the invention has been illustrated and described as embodied in a device for remotely supervising operation of a branched data-transmission network, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A device for remotely supervising operation of a data transmission network which contains a plurality of subnetworks branching from one another, comprising
 a plurality of transmitters operatively connected to individual locations in respective sub-networks and each operating at an assigned characteristic frequency;
 means for scanning in consecutive scanning cycles characteristic frequencies of respective transmitters whereby all said characteristic frequencies are scanned during each of said consecutive scanning cycles;
 means connected to said scanning means for interpreting the scanned responses of respective transmitters as to the presence or absence of the characteristic frequency thereof;
 means connected to said interpreting means for storing at separate storing locations the successive responses interpreted in one scanning cycle;
 means connected to said storing means and to said interpreting means for comparing the responses stored during the one scanning cycle with responses interpreted during the subsequent scanning cycles; and
 means connected to said comparing means for signalling differences between the stored responses and the subsequent responses to determine, according to the storing locations, the operational conditions of the supervised sub-networks.

2. A device as defined in claim 1, wherein said scanning means includes a selecting switch connected to the outputs of respective transmitters; said interpreting means including a level interpreter connected to the switch, and control means connected to said switch in such a manner that the switch repeatedly executes a sequence in which each transmitter is individually connected to the interpreter; said storing means including an addressable memory having an output, a first input connected to said control means and a second input connected to said interpreter for assigning a unique memory address to each transmitter and to cause such address in the memory to be addressed when the switch is connected thereto, and the control means further being connected to the interpreter to adjust the same to that frequency which corresponds to the frequency received from the corresponding transmitter; said comparing means including a comparator having two inputs and an output, one of the inputs being connected to said interpreter and the other input being connected to the output of said memory; and said signalling means including an alarm system connected to the output of said comparator.

3. A device as defined in claim 2 further including a hand-operated switch having a normally open first contact connected between one input of said comparator and an input of said memory, and a normally closed second contact connected between the other input of said comparator and the output of said memory, said first and second contacts being interconnected such that when the first contact is closed the second contact is opened.

* * * * *